United States Patent [19]
Kikuchi et al.

[11] Patent Number: 5,707,462
[45] Date of Patent: Jan. 13, 1998

[54] PNEUMATIC TIRE WITH A PAIR OF SIDEWALL SHORT FIBER REINFORCING LAYERS

[75] Inventors: Naohiko Kikuchi, Kobe; Tadao Matsumoto, Akashi; Maiko Okada, Kobe, all of Japan

[73] Assignee: Sumitomo Rubber Industries, Ltd., Hyogo-ken, Japan

[21] Appl. No.: 579,142

[22] Filed: Dec. 27, 1995

[30] Foreign Application Priority Data

Dec. 27, 1994 [JP] Japan ................. 6-338575

[51] Int. Cl.$^6$ ............... B60C 1/00; B60C 9/00; B60C 11/00; B60C 13/00
[52] U.S. Cl. ............. 152/209 R; 152/454; 152/458; 152/525; 152/538; 152/546; 152/554; 152/555
[58] Field of Search ................ 152/458, 555, 152/209 R, 454, 538, 546, 554, 564, 525

[56] References Cited

U.S. PATENT DOCUMENTS

| | | | |
|---|---|---|---|
| 3,050,098 | 8/1962 | Grote | 152/458 |
| 3,077,915 | 2/1963 | Weber | 152/555 X |
| 3,095,027 | 6/1963 | Weber | 152/458 |
| 4,067,372 | 1/1978 | Masson | 152/555 X |
| 5,388,627 | 2/1995 | Nakada | 152/458 X |
| 5,467,807 | 11/1995 | Neddenriep et al. | 152/458 |
| 5,538,063 | 7/1996 | Dwenger et al. | 152/555 X |
| 5,620,539 | 4/1997 | Ide | 152/555 X |

FOREIGN PATENT DOCUMENTS

| | | |
|---|---|---|
| 0554108 | 8/1993 | European Pat. Off. . |
| 0581549 | 2/1994 | European Pat. Off. . |
| 0652118 | 5/1995 | European Pat. Off. . |
| 2261888 | 9/1975 | France . |
| 63-170109 | 7/1988 | Japan ................. 152/555 |

*Primary Examiner*—Adrienne C. Johnstone
*Attorney, Agent, or Firm*—Birch, Stewart, Kolasch & Birch, LLP

[57] ABSTRACT

A pneumatic tire comprises a radially innermost belt ply having an axial width of from 0.8 to 1.2 times the tread width, a carcass with turnup portions having a radially outer end at a height of not more than 0.15 times the tire section height H, and a short fiber reinforcing layer having a thickness of from 0.3 to 1.0 mm disposed along the axially outer surface of the carcass in each of a pair of sidewall portions between the axial outer edge of the radially innermost belt ply and the radially outer end of the carcass turnup portion. The short fiber reinforcing layer is a compound of: 100 parts by weight of a base rubber compound containing 40 to 70 parts by weight of butadiene rubber and 60 to 30 parts by weight of natural rubber and/or isoprene rubber; 10 to 30 parts by weight of short fiber; and not more than 30 parts by weight of carbon black whose iodine number is in the range of from 30 to 90 mg/g. The short fiber in the short fiber reinforcing layer is oriented so that the oriented direction of at least 90% of the short fiber is in the range of from +20 to −20 degrees to the circumferential direction of the tire. The short fiber reinforcing layer has a directional complex elastic modulus such that the complex elastic modulus $E^*a$ in the circumferential direction is not less than 5 times the complex elastic modulus $E^*b$ in the radial direction.

4 Claims, 1 Drawing Sheet

PNEUMATIC TIRE WITH A PAIR OF SIDEWALL SHORT FIBER REINFORCING LAYERS

BACKGROUND AND SUMMARY OF THE INVENTION

The present invention relates to a pneumatic tire, in which the rolling resistance is reduced without sacrificing the steering stability and ride comfort.

In recent years, it is strongly requested that fuel consumption of the cars is decreased to improve the earth environment and save resources.

In general, for decreasing the fuel consumption of a car, it is very important to improve the efficiency of its internal combustion engine and to reduce the running resistance.

If pneumatic tires are increased in the inner pressure and/or decreased in weight, the rolling resistance thereof may be decreased and the running resistance of the car can be decreased. However, other tire performances, for example, steering stability, ride comfort and the like are greatly deteriorated.

In a pneumatic tire, therefore, it has been proposed to reduce the energy loss during rolling such as internal friction and internal heat generation of the tread rubber by disposing a low hysteresis loss rubber compound in the tread face that is subjected to a compressive deformation when contacting with the road surface.

In the case that a low hysteresis loss rubber compound is disposed in the tread face as mentioned above, it is possible to reduce the internal friction in the tread portion. However, an effect of a part other than the tread, that is, the sidewall portion and bead portion on the rolling resistance increases. As a result, a sufficient effect on reducing the rolling resistance can not be obtained by the improvement in only the tread portion.

In a pneumatic radial tire, which comprises a carcass having edge portions each turned up around each bead core from the axially inside to outside of the tire and a bead apex extending radially outwardly from the bead core, it is good for reducing the rolling resistance to decrease the height of the turnup portion and the bead apex. However, when the heights are decreased, the tire rigidity decreases, and the steering stability is greatly decreased.

On the other hand, when the sidewall portion of such tire is reinforced with a steel cord ply, the rolling resistance increases and the ride comfort decreases.

Thus, the present invention is directed to decreasing the rolling resistance without deteriorating the steering stability and ride comfort of a pneumatic tire which has a low-height carcass turnup portion and low-height bead apex and a low hysteresis loss tread rubber. It was discovered that it is effective to dispose in the sidewall portion, a short fiber reinforcing layer made of rubber having specific physical properties and reinforced with short fiber which is oriented in the tire circumferential direction.

It is therefore, an object of the present invention to provide a pneumatic tire, in which the rolling resistance is decreased without causing a deterioration in the steering stability and ride comfort.

According to one aspect of the present invention, a pneumatic tire has an aspect ratio of not less than 60%, and comprises

- a pair of bead cores, one disposed in each of a pair of bead portions,
- a carcass extending between the bead portions through a tread portion and a pair of sidewall portions and turned up around the bead cores to define a pair of turnup portions,
- a belt disposed radially outside the carcass in the tread portion and comprising belt plies of which the radially innermost ply has an axial width of from 0.8 to 1.2 times the tread width,
- a pair of bead apexes, each tapering radially outwardly from one of the bead cores,
- each of the carcass turnup portions having a radially outer end at a height of not more than 0.15 times the tire section height H, each measured from the bead base line,
- each of the bead apexes having a radially outer end at a height of not more than 0.25 times the tire section height H, each measured from the bead base line,
- a tread rubber disposed in the tread portion to define the ground contacting tread face having a loss tangent of not more than 0.14,
- a pair of short fiber reinforcing layers each disposed in one of the sidewall portions between the axial outer edge of the radially innermost belt ply and the radially outer end of the turnup portion of the carcass, and extending along the axially outer surface of the carcass,
- each of the short fiber reinforcing layers having a thickness of from 0.3 to 1.0 mm,
- the short fiber reinforcing layers being made of a compound of
  - 100 parts by weight of a base rubber compound containing
    - 40 to 70 parts by weight of butadiene rubber and 60 to 30 parts by weight of natural rubber and/or isoprene rubber
  - 10 to 30 parts by weight of short fiber, and
  - not more than 30 parts by weight of carbon black whose iodine number is in the range of from 30 to 90 mg/g,
- the short fiber in each of the short fiber reinforcing layers oriented so that the oriented direction of not less than 90% of the short fiber is in the range of from +20 to −20 degrees to the circumferential direction of the tire, and
- each of the short fiber reinforcing layers having a directional complex elastic modulus such that the complex elastic modulus $E^*a$ in the circumferential direction is not less than 5 times the complex elastic modulus $E^*b$ in the radial direction, the loss tangent and the complex elastic modulus being measured at a temperature of 7° C., a frequency of 10 Hz, an initial strain of 10% and a dynamic distortion of ±1%.

BRIEF DESCRIPTION OF THE DRAWINGS

An embodiment of the present invention will now be described in detail in conjunction with the accompanying drawing, in which.

DETAILED DESCRIPTION OF THE INVENTION

Figure 1:
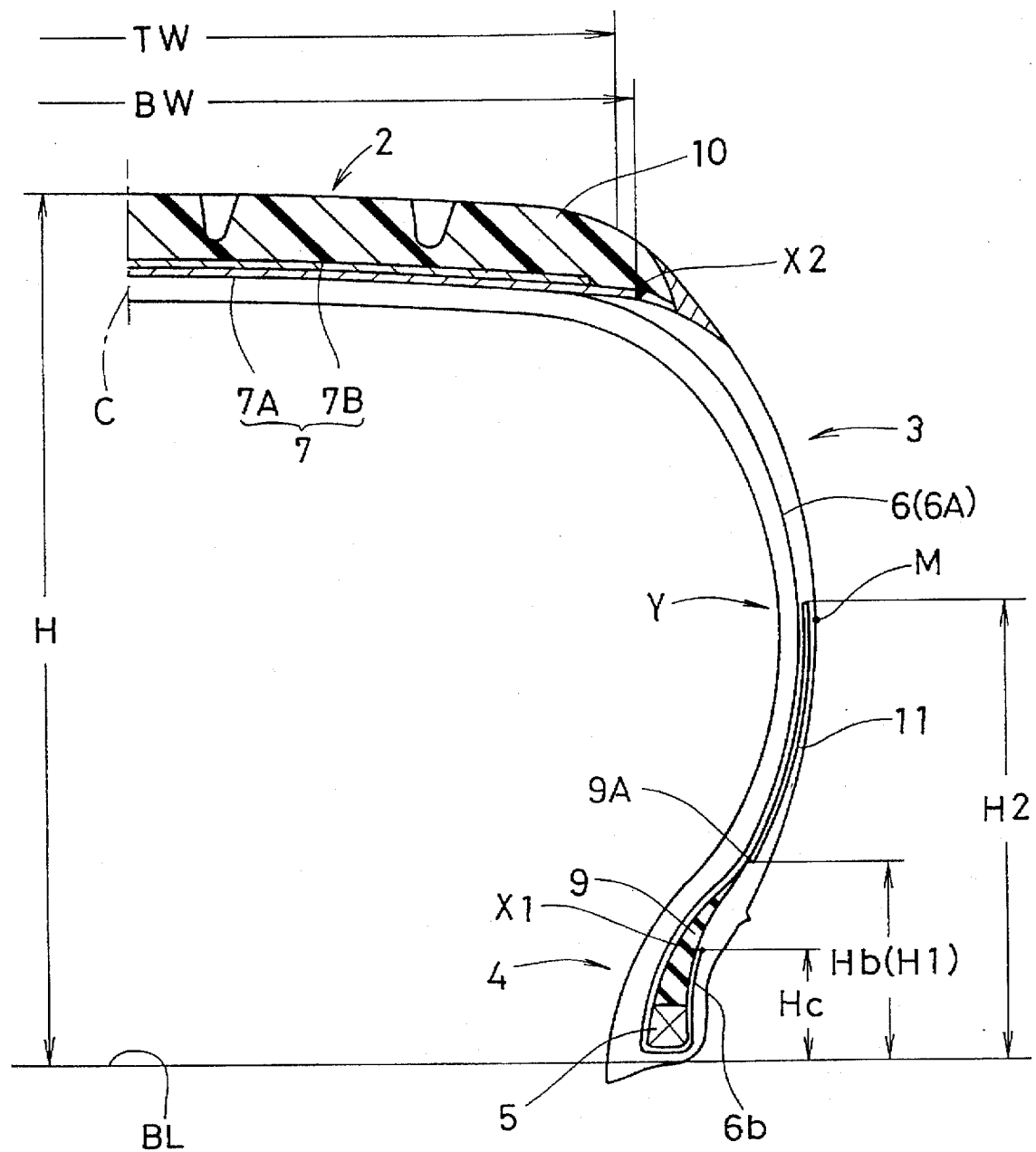
FIG. 1 is a tire meridian sectional view (a right half) of an embodiment of the present invention.

In FIG. 1, a pneumatic tire of the present invention comprises a tread portion 2, a pair of bead portions 4 with a bead core 5 therein, a pair of sidewall portions 3 extending therebetween, a carcass 6 extending between the bead portions 4 through the tread portion 2 and sidewall portions 3, a belt 7 disposed radially outside the carcass 6 in the tread portion 2, and a bead apex 9 disposed in each bead portion and tapering radially outwardly from the bead core 5.

The carcass 6 comprises at least one ply of cords arranged radially at an angle of from 90 to 65 degrees to the tire equator C, which ply is turned up around the bead cores 5 in the bead portions from the inside to outside of the tire to provide a pair of turnup portions 6b and one main portion therebetween. In this embodiment, the carcass 6 consists of a single ply 6A.

For the carcass cords, organic fiber cords, e.g. nylon, rayon, polyester, aromatic polyamide and the like and inorganic cords, e.g. steel and the like can be used. But organic fiber cords are preferably used in view of a tire weight reduction.

The height Hc of the radially outer end X1 of the turnup portions 6b from the bead base line BL is not more than 0.15 times, preferably 0.12 to 0.15 times the tire section height H so as to have a so called low turnup (LTU) carcass structure.

The belt 7 comprises at least two cross plies, a radially innermost ply 7A and a radially outer ply 7B disposed radially outside thereof. The cords of each ply 7A, 7B are laid at a small angle of not more than 30 degrees, preferably not more than 20 degrees with respect to the tire equator to provide a hoop effect on the carcass 6 and to reinforce the tread portion. The inner ply 7A is wider than the outer ply 7B, and the axial width BW of the innermost ply 7A is in the range of from 0.8 to 1.2 times the tread width TW.

The bead apex 9 is made of a hard rubber compound having a JIS A hardness of from 65 to 95 degrees. The bead apex is disposed axially between each turnup portion and the main portion of the carcass and tapers radially outwardly from the bead apex. The radially outer end 9A of the bead apex 9 is preferably disposed at a height Hb of not more than 0.25 times, preferably 0.20 to 0.25 times the tire section height H, each measured from the bead base line BL.

As the turnup portion and bead apex are limited in the low height ranges, the decreasing of the rolling resistance can be facilitated. However, in order to provide a good balance between the rolling resistance and steering stability, the tire aspect ratio is preferably set in the range of more than 60%.

Further, a tread rubber 10 is disposed on the radially outside of the belt in the tread portion to define the ground contacting face thereof.

The loss tangent of the tread rubber is usually about 0.18 to 0.28, but in the present invention, the loss tangent is set in a lower range of not more than 0.14, but not less than 0.07. If the loss tangent is more than 0.14, the internal friction of the rubber tends to increase, and the tread portion can not decrease the rolling resistance. If the loss tangent is less than 0.07, the wear resistance decreases.

By using such a low hysteresis loss rubber in the tread portion, the internal friction and internal heat generation are decreased. As a result, the rolling resistance can be decreased. Accordingly, in this case a part other than the tread portion, especially the sidewall portion has much influence on the rolling resistance. Thus, to reduce the rolling resistance by a contribution from the sidewall portion, a short fiber reinforcing layer 11 is provided.

The short fiber reinforcing layer 11 is disposed within a region Y in each sidewall portion between the radially outer end X1 of the carcass turnup portion 6b and the belt edge X2 which is the axial outer edge X2 of the radially innermost belt ply 7A in this example. The short fiber reinforcing layer 11 extends continuously in the tire circumferential direction along the axially outer surface of the carcass 6.

The short fiber reinforcing layer is made of a rubber compound including a base rubber, carbon black, short fiber and the like.

The base rubber is a mixture of 40 to 70 parts by weight of butadiene rubber and 60 to 30 parts by weight of (natural rubber and/or isoprene rubber).

For the short fiber, for example organic fiber such as nylon, polyester, aramid, rayon, vinylon, cotton, cellulose resin, crystalline polybutadiene, and inorganic fiber such as metal fiber, glass fiber and the like can be used. It may be possible to use fiber of a plurality of materials as well as fiber of a single material. It is preferable to make a surface treatment for improving the adhesion of the short fiber to the rubber.

The short fiber content amounts to 10 to 30, preferably 10 to 20 parts by weight with respect to 100 parts by weight of the base rubber. If the short fiber content is less than 10 parts by weight, the tire circumferential rigidity can not be maintained, and there is no effect on improving the steering stability. If the short fiber exceeds 30 parts by weight, the rigidity unfavorably increases, and ride comfort deteriorates.

The average length (L) of the short fiber is in the range of not less than 20 micron, preferably 50 to 1000 micron.

The ratio (L/D) of the fiber length (L) to the fiber diameter (D) is in the range of not less than 100, preferably, 200 to 2000. If the ratio (L/D) is less than 100, the rubber cannot be provided with sufficient strength by the orientation of the short fiber described hereinafter.

In the present invention, it is very important to orient at least 90% of the short fiber within plus/minus 20 degrees to the tire circumferential direction. As a result, the rigidity in the tire circumferential direction in improved, and both the steering stability and ride comfort can be improved. If the short fiber is not so oriented, such effects cannot be obtained.

Further, the ratio ($E^*a/E^*b$) of the complex elastic modulus $E^*a$ to the complex elastic modulus $E^*b$ of the short fiber reinforcing layer 11 is set in the range of not less than 5, preferably, 7 to 20, wherein, the complex elastic modulus $E^*a$ is that in the orientation direction of the short fiber, that is, the tire circumferential direction. The complex elastic modulus $E^*b$ is that in the direction perpendicular to the orientation direction, that is, the tire radial direction. If the ratio ($E^*a/E^*b$) is less than 5, the ride comfort may be improved, but the steering stability, especially handle response decreases.

The thickness of the short fiber reinforcing layer is set in the range of from 0.3 to 1.0 mm, preferably 0.5 to 1.0 mm. If the thickness exceeds 1.0 mm, the rigidity difference between the fiber oriented direction and the perpendicular direction decreases. As a result, the improvement in the steering stability is decreased, and the rolling resistance and tire weight increase. If the thickness is less than 0.3 mm, the production is difficult.

Carbon black having an iodine number of from 30 to 90 mg/g is preferably used. For example, HAF(82), FEF(43), GPF(36) and the like provided by Showa Cabot company, Mitsubishi chemical company, Tokai carbon company etc., can be used. If the iodine number is less than 30 mg/g, the reinforcement for the rubber is low and the rubber decreases in strength and cut resistance. If the iodine number is more than 90 mg/g, the rubber increases in heat generation, and the tire rolling resistance increases.

With respect to 100 parts by weight of the base rubber, the carbon black content is in the range of not more than 30 parts by weight, preferably, 10 to 25 parts by weight. If the carbon black content exceeds 30 parts by weight, the heat generation increases and also the rolling resistance increases.

Thus, in the present invention, the content of the carbon black which generally increases the rigidity and heat generation of the rubber can be decreased, because the tire circumferential rigidity can be increased by the oriented short fiber. Thus, a balance between the rolling resistance and steering stability is improved, and a tire weight reduction can be achieved.

Further, oil, antioxidant, wax, vulcanization accelerator and the like are added to the rubber compound.

By means of extruding or calendering the above-mentioned rubber compound, a seat of rubber for forming the short fiber reinforcing layer in which at least 90% of short fiber is oriented in a certain direction is manufactured.

The short fiber reinforcing layer is preferably disposed in a region between the radially outer end of the bead apex 9 and the maximum tire section width point M to achieve both the steering stability and ride comfort. In FIG. 1, the radially inner end of the short fiber reinforcing layer 11 is disposed at substantially the same height H1 as the height Hb of the radially outer edge 9A of the bead apex 9. The radially outer end is disposed at substantially the same height H2 as that of the maximum tire sectional width point M. The height H2 from the bead base line BL is 0.45 to 0.70 times, preferably 0.45 to 0.55 times the tire section height H. (In FIG 1, H2 =0.52 H) It is however also possible that the short fiber reinforcing layer 11 extends from the position X1 to the position X2.

The above-mentioned loss tangent and complex elastic modulus were measured with a viscoelasticity spectrometer (VESF-III model) made by Iwamoto-seisakusyo Co., Ltd. The measuring conditions were as follows: temperature of 70 degrees C., frequency of 10 Hz, initial strain of 10%, dynamic distortion of ±1%.

(Comparison Tests)

Using five compositions 1 to 5 shown in Table 1, short fiber reinforcing layers were made by means of extruding. The short fiber A and B in Table 1 are KEVLAR (aromatic polyamide) short fiber and nylon short fiber, respectively. The short fiber A, B was mixed with natural rubber NR at the specified percentage in advance. NR in Table 1 indicates the total of NR included in the rubber compound. The iodine number of carbon black was 43 mg/g. Only the compositions 1 and 2 satisfied the limitations of the present invention.

TABLE 1

|  | (parts by weight) | | | | |
|---|---|---|---|---|---|
| Composition | 1 | 2 | 3 | 4 | 5 |
| NR | 45 | 45 | 45 | 45 | 70 |
| BR | 55 | 55 | 55 | 55 | 30 |
| Short fiber A *1 | 15 | | 5 | 15 | |
| Short fiber B *2 | | 15 | | | 35 |
| Carbon black | 20 | 20 | 20 | 40 | 10 |

*1 KEVLAR short fiber (M/B 6F722 Du Point)
*2 Nylon short fiber (HE-0100 Ube Industries)

By using a short fiber reinforcing layer made of composition 1 in Table 1 (E*a/E*b=12.3), a tire according to the present invention (EX.1) whose tire size was 205/65R15 and which had the construction shown FIG. 1 was experimentally made. Also reference tires (Ref. 1 and 2) having no short fiber reinforcing layer were experimentally made. Each tire was tested for the rolling resistance, steering stability and ride comfort as follows.

(1) Rolling resistance

Each tire was mounted on a 6JJ×15 rim, and the rolling resistance was measured with a rolling resistance tester under an inner pressure of 2.0 kg/sq.cm, a speed of 80 km/h and a load of 400 kgf. The resistance is indicated by an index based on that the reference tire 1 is 100. The smaller the index, the better the performance.

(2) Steering stability

A test car (a 3000cc FF car) provided on the four wheels with test tires was run on a dry asphalt road surface in a test course, and the handle response, rigidity impression, grip, and the like were evaluated by the driver's feeling. The results are indicated by an index based on that reference tire 1 is 100. The larger the index, the better the stability.

(3) Ride comfort

Similarly to the above-mentioned test, a driver's feeling test regarding ruggedness impression, push up, dumping, was carried out on a stepped dry asphalt road surface, a stone paved road surface and a pebble scattered road surface. The results are indicated by an index based on that reference tire 1 is 100. The larger the index, the better the ride comfort.

TABLE 2

| Tire | Ex. 1 | Ref. 1 | Ref. 2 |
|---|---|---|---|
| Short fiber reinforcing layer | | non | non |
| Rubber composition | 1 | — | — |
| Thickness (mm) | 0.7 | — | — |
| Fiber orientation *3 | C | — | — |
| Carcass Hc/H ratio | 0.15 | 0.15 | 0.30 |
| Bead apex Hb/H ratio | 0.25 | 0.35 | 0.25 |
| Test result | | | |
| Rolling resistance | 90 | 100 | 105 |
| Steering stability | 105 | 100 | 105 |
| Ride comfort | 105 | 100 | 95 |

*3 C = oriented in tire circumferential direction

It was confirmed from the test results that the Ex. 1 tire was improved in the steering stability and ride comfort and the rolling resistance was greatly decreased. (about 10% lower than Ref. 1)

Next, changing the composition, thickness and complex elastic modulus ratio (E*a/E*b) of the short fibers reinforcing layer of the Ex. 1 tire, a test similar to the above-mentioned test was carried out. The test results are shown in Table 3.

TABLE 3

| Tire | Ex. 1 | Ex. 2 | Ex. 3 |
|---|---|---|---|
| Short fiber reinforcing layer | | | |
| Rubber composition | 1 | 1 | 2 |
| Thickness (mm) | 0.7 | 0.5 | 0.7 |
| Fiber orientation *3 | C | C | C |
| E*a/E*b | 12.3 | 15.1 | 6.9 |
| Carcass Hc/H ratio | 0.15 | 0.15 | 0.15 |
| Bead apex Hb/H ratio | 0.25 | 0.25 | 0.25 |
| Test result | | | |
| Rolling resistance | 90 | 90 | 92 |
| Steering stability | 105 | 107 | 102 |
| Ride comfort | 105 | 103 | 103 |

*3 C = oriented in tire circumferential direction

In the composition 1, when the thickness of the short fiber reinforcing layer was decreased, the ride comfort was slightly lowered, but the steering stability was improved.

On the other hand, Table 4 shows the results of an evaluation test when the short fiber reinforcing layer is out of the limitations of the present invention.

TABLE 4

| Tire | Ref. 3 | Ref. 4 | Ref. 5 | Ref. 6 | Ref. 7 |
| --- | --- | --- | --- | --- | --- |
| Short fiber reinforcing layer | | | | | |
| Composition | 1 | 1 | 3 | 4 | 5 |
| Thickness (mm) | 1.5 | 0.7 | 0.7 | 0.7 | 0.7 |
| Fiber orientation *3 | C | R | C | C | C |
| E*a/E*b | 4.8 | 12.3 | 2.1 | 11.6 | 10.1 |
| Carcass Hc/H | 0.15 | 0.15 | 0.15 | 0.15 | 0.15 |
| Bead apex Hb/H | 0.25 | 0.25 | 0.25 | 0.25 | 0.25 |
| Test result | | | | | |
| Rolling resistance | 98 | 90 | 90 | 99 | 99 |
| Steering stability | 96 | 95 | 98 | 106 | 102 |
| Ride comfort | 102 | 95 | 100 | 102 | 99 |

*3 C = oriented in tire circumferential direction
R = oriented in tire radial direction In the Ref. 3 tire, as the thickness of the short fiber reinforcing layer was increased, the value E*a/E*b did not reached to 5, and also the orientation effect of the short fiber was not obtained. As a result, the steering stability was remarkably deteriorated.

In the Ref. 4 tire, as the short fiber was oriented in the tire radial direction, the steering stability and ride comfort were deteriorated.

In the Ref. 5 tire, as the short fiber content in the composition 3 was less than 10 parts by weight, the effect of the orientation of the short fiber was not obtained, and the complex elastic modulus ratio (E*/E*b) did not reached to 5. As a result, the steering stability is decreased.

Similarly, in the Ref.6 tire with a high carbon black content, the heat generation from the rubber of the short fiber reinforcing layer was remarkably increased, and the rolling resistance was not decreased. Further, the same result was obtained in the Ref. 7 tire in which the short fiber content was too high.

It was confirmed that the above-mentioned benefits of the present invention can be obtained in other tire sizes, but the present invention may be suitably applied to a passenger car tire.

As explained above, in the pneumatic tire of the present invention, the rolling resistance is greatly reduced without sacrificing the steering stability and ride comfort.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire having an aspect ratio of not less than 60% comprising a pair of bead cores, one disposed in each of a pair of bead portions, a carcass extending between the bead portions through a tread portion and a pair of sidewall portions and turned up around the bead cores to define a pair of turnup portions, a belt disposed radially outside the carcass in the tread portion and comprising belt plies of which the radially innermost ply has an axial width of from 0.8 to 1.2 times the tread width, a pair of bead apexes, each tapering radially outwardly from one of the bead cores, each of the carcass turnup portions having a radially outer end at a height of not more than 0.15 times the tire section height H, each measured from the bead base line, each of the bead apexes having a radially outer end at a height of not more than 0.25 times the tire section height H, each measured from the bead base line, a tread rubber disposed in the tread portion to define the ground contacting tread face having a loss tangent of not more than 0.14, a pair of short fiber reinforcing layers each disposed in one of the sidewall portions between the axial outer edge of the radially innermost belt ply and the radially outer end of the turnup portion of the carcass, and extending along the axially outer surface of the carcass, each of the short fiber reinforcing layers having a thickness of from 0.3 to 1.0 mm, the short fiber reinforcing layers being made of a compound of 100 parts by weight of a base rubber compound containing 40 to 70 parts by weight of butadiene rubber and 60 to 30 parts by weight of natural rubber and/or isoprene rubber, 10 to 30 parts by weight of short fiber, and not more than 30 parts by weight of carbon black whose iodine number is in the range of from 30 to 90 mg/g, the short fiber in each of the short fiber reinforcing layers oriented so that the oriented direction of not less than 90% of the short fiber is in the range of from +20 to −20 degrees to the circumferential direction of the tire, and each of the short fiber reinforcing layers having a directional complex elastic modulus such that the complex elastic modulus E*a in the circumferential direction is not less than 5 times the complex elastic modulus E*b in the radial direction, the loss tangent and the complex elastic modulus being measured at a temperature of 70° C. a frequency of 10Hz an initial strain of 10% and a dynamic distortion of +1%.

2. The pneumatic tire according to claim 1, wherein the height of the radially outer ends of the carcass turnup portions is in the range of from 0.12 to 0.15 times the tire section height, and the height of the radially outer ends of the bead apexes is in the range of from 0.20 to 0.25 times the tire section height.

3. The pneumatic tire according to claim 1, wherein in each sidewall portion the short fiber reinforcing layer extends between the radially outer end of the bead apex and the maximum tire section width portion.

4. The pneumatic tire according to claim 3, wherein the height of the radially outer ends of the carcass turnup portions is in the range of from 0.12 to 0.15 times the tire section height, and the height of the radially outer ends of the bead apexes is in the range of form 0.20 to 0.25 times the tire section height.

* * * * *